July 11, 1967 P. B. CLEMENTS 3,330,233
CHIMNEYS
Filed Aug. 3, 1965 7 Sheets-Sheet 1
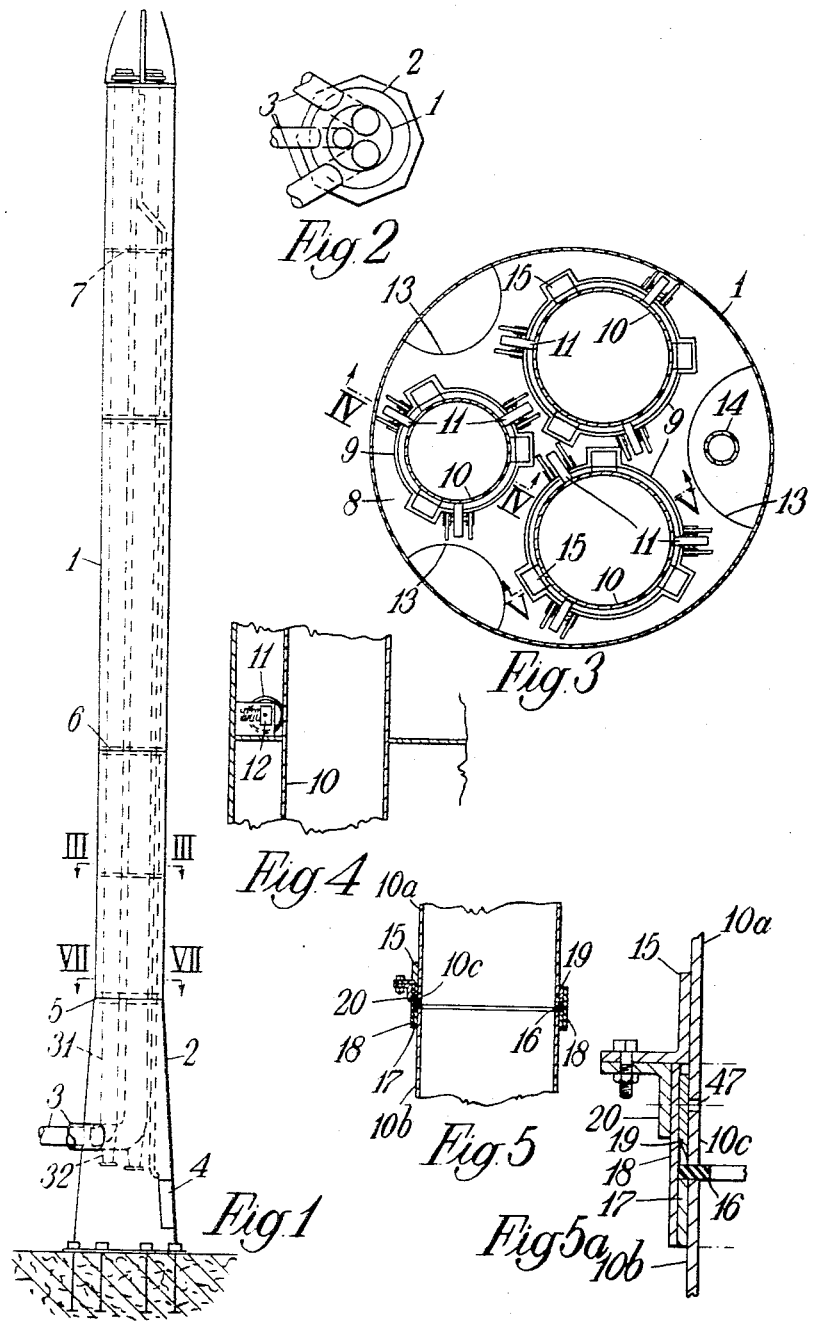

July 11, 1967  P. B. CLEMENTS  3,330,233
CHIMNEYS
Filed Aug. 3, 1965  7 Sheets-Sheet 3
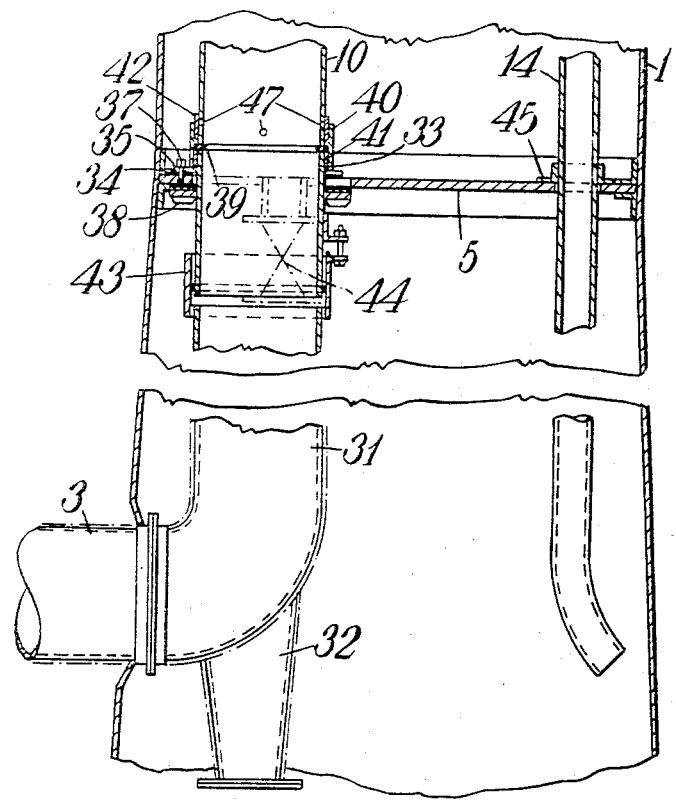
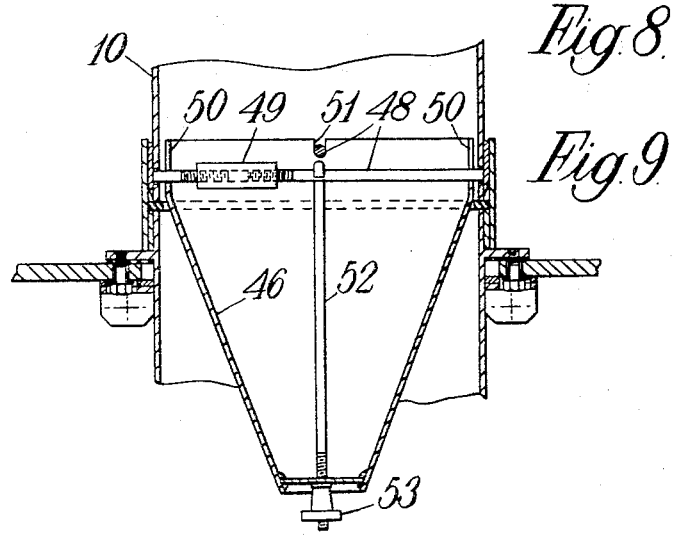
Fig.8.
Fig.9.

July 11, 1967 P. B. CLEMENTS 3,330,233
CHIMNEYS
Filed Aug. 5, 1965 7 Sheets-Sheet 4

July 11, 1967 P. B. CLEMENTS 3,330,233
CHIMNEYS
Filed Aug. 3, 1965 7 Sheets-Sheet 5

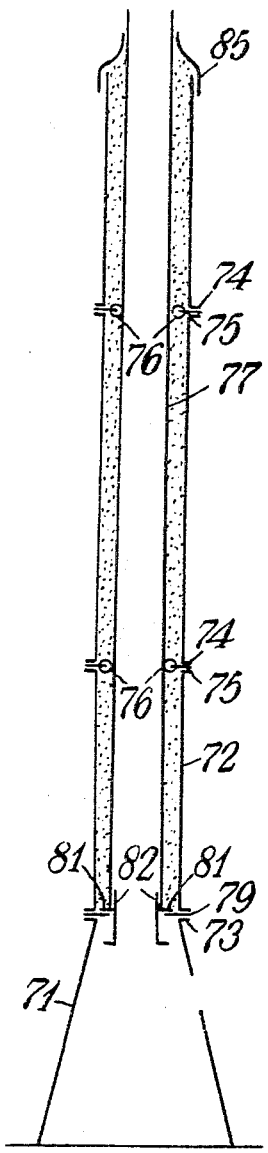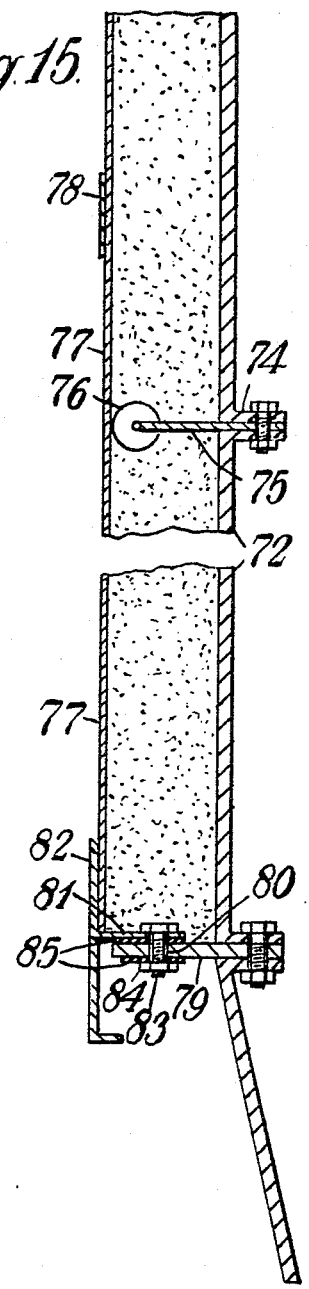

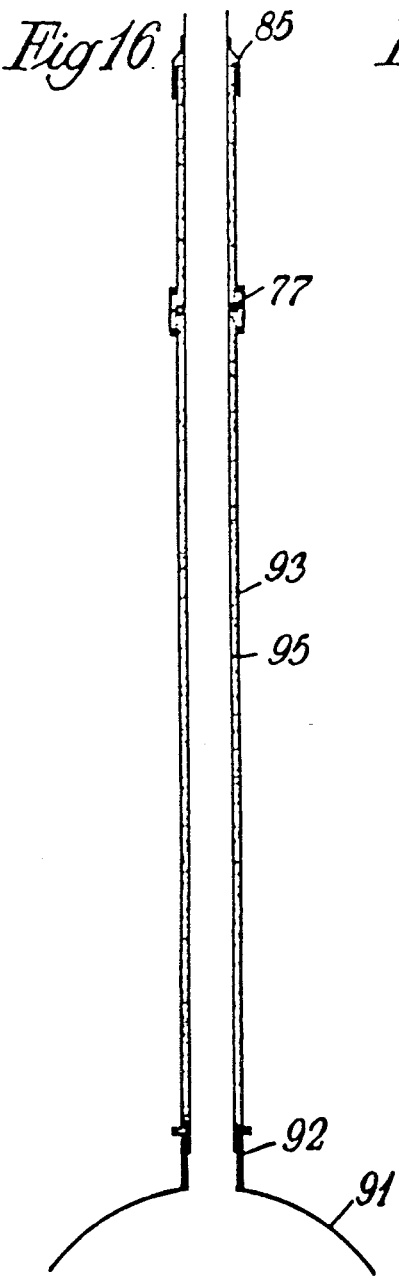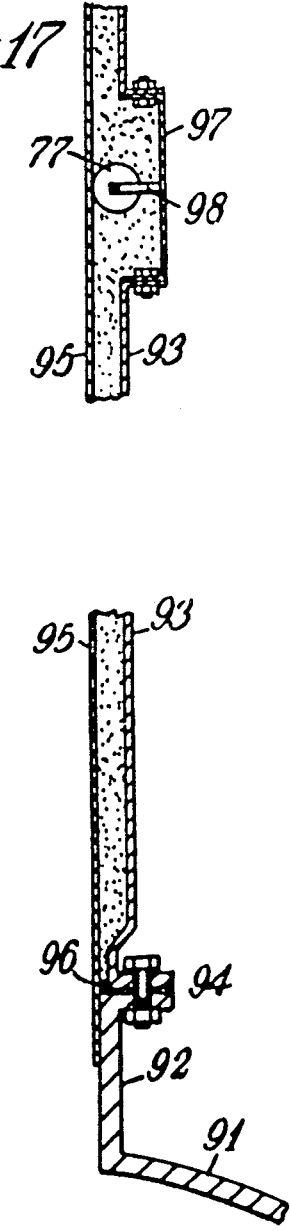

United States Patent Office 3,330,233
Patented July 11, 1967

3,330,233
CHIMNEYS
Paul Bernard Clements, 161 Surrenden Road,
Brighton, Sussex, England
Filed Aug. 3, 1965, Ser. No. 476,955
Claims priority, application Great Britain, Aug. 12, 1964,
32,805/64; Oct. 19, 1964, 42,625/64
15 Claims. (Cl. 110—184)

This invention relates to chimneys having an outer shell, normally of metal or masonry, and one or more flues, normally of a suitable steel, supported within the outer shell.

The invention consists in a chimney comprising an outer shell and at least one fabricated flue supported within the shell, the chimney having the improvement that it comprises at least one group of rollers or wheels mounted on the outer shell and spaced around the said at least one flue in rolling contact therewith to provide lateral support and guidance for the said at least one flue during longitudinal movement arising from thermal expansion and contraction and introduction or removal from the outer shell, and a loose fill of insulating material filling the space within the outer shell and outside the said at least one flue.

In a single flue chimney the rollers or wheels may be mounted on brackets secured between jointing flanges of adjacent sections of the outer shell.

Alternatively the rollers or wheels may be mounted on short sections of the outer shell which are of slightly increased diameter. By this means the mean diameter of the outer shell may be kept at a minimum and only locally increased to the size required to accommodate the support rollers or wheels.

In an alternative arrangement, suitable for multi-flue chimneys but not so limited, the rollers or wheels may be mounted on one or more apertured plates or discs secured in the shell intermediate its ends, the flues extending through the apertures and the rollers or wheels being spaced around the corresponding apertures.

In a still further alternative arrangement, for a multi-flue chimney, some of the rollers or wheels are mounted on the shell and others are mounted on one or more sub-frames supported by the shell.

In a particular arrangement, at least one flue is supported by wheels or rollers mounted in a duct, the duct itself being supported in the outer shell by means of wheels or rollers.

Such a flue will accept very hot gases, and the flue's steel skin will be cooled by a natural draught induced up the duct.

Conveniently, the support rollers or wheels are mounted in spring loaded bearings so that the outside dimension of the flues may vary, as at joints between sections or by thermal expansion, without affecting the operation of the support rollers or wheels.

With modern techniques for dealing with waste gases, the gas entering the flues for discharge to atmosphere is comparatively cool and so it is necessary to reduce cooling in the flue itself to a minimum otherwise the gas temperature may fall below the acid dew point and acid smuts would then be discharged, contrary to law and constituting a nuisance.

In order to reduce metal to metal heat conduction paths between the flues and the shell of the chimney, the rollers or wheels are preferably faced with a material having a low heat conductivity.

In order to achieve filling with the loose fill of insulating material, a tube may pass up inside the outer shell and be provided with a means, such as a deflector or return bend, at the top adjacent the centre of the shell, whereby granules of insulating material blown up the tube are deflected into the outer shell until the latter is filled. Any locating discs or plates may have cut away portions to allow the granules to pass downwards through them.

The upper end of the shell may be closed by a cap having apertures with upstanding collars for the flues and gaps between the collars and the flues. The gaps prevent heat losses by conduction between the flue and the shell and also act as an escape path for air displaced during filling with the insulating material.

The invention will be further described with reference to the accompanying drawings, in which:

FIGURE 1 is a diagrammatic elevation of a preferred form of multi-flue chimney according to the invention.

FIGURE 2 is a plan view of the chimney of FIGURE 1, with certain details omitted for clarity;

FIGURE 3 is a section on the line III—III of FIGURE 1, to an enlarged scale;

FIGURE 4 is a section on the line IV—IV of FIGURE 3;

FIGURE 5 is a section on the line V—V of FIGURE 3;

FIGURE 5a shows an enlarged detail of FIGURE 5;

FIGURE 8 is a section on the line VIII—VIII of FIGURE 7;

FIGURE 9 is a section through a removable cone for guiding the flue into the chimney outer shell;

FIGURE 14 is a diagrammatic section of a first form of the invention as applied to a single flue chimney;

FIGURE 15 is a section of part thereof to an enlarged scale; and

FIGURES 16 and 17 are views similar to FIGURES 14 and 15 of a second form of the invention as applied to a single flue chimney.

Figure 6:
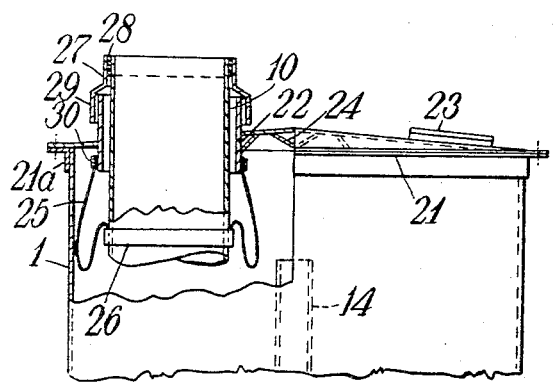
FIGURE 6 is a vertical section, to an enlarged scale, of the upper portion of the chimney of FIGURE 1.

Referring first to FIGURES 1 to 9 of the accompanying drawings, FIGURE 1 shows the chimney outer shell as comprising a cylindrical section 1, e.g. 60 feet high, surmounting and secured to a conical base section 2, e.g. 20 feet high. Each section is fabricated of mild steel plate and the sections are jointed by mating flanges. The cylindrical section may be in separate parts jointed with internal angles and site welded after erection.

Three orifices are provided in the base section for entry of branch inlets 3. There is a ground level access door 4 in the base section.

A supporting plate 5 is provided at the level between the two sections 1 and 2 and serves to support the flues housed in the parallel section 1 and to provide connection between these and the branch inlets.

Lightning conductors are also shown.

Locating discs are positioned, e.g. welded to the wall of the parallel section, at intervals, e.g. at levels 6 and 7 above the supporting plate 5. The discs 8 (see FIGURE 3) are fabricated of mild steel plate, and have three perforations 9. Each perforation 9 is 2″ internal diameter larger than the outside diameter of the corresponding flue 10. Each perforation carries three locating wheels 11, disposed radially at 120° intervals. These wheels rotate on spring loaded bearings 12 (see FIGURE 4) and are faced with material similar to brake linings to avoid metal to metal contact. The edges of the locating discs 8 are scalloped at 13, to permit the granules of insulating material to flow past them. A filling tube 14 passes through one scalloping. Above the level 7, the filling tube 14 is cranked so as to end centrally of the shell.

FIGURES 5 and 5a show a joint between adjacent sections 10a and 10b of a flue 10. The section 10a carries three spaced mounting brackets 15 adjacent the lower end. A sealing gasket 16 rests on the upper end of the section 10a and on a surrounding collar 17. A socket 18 is welded to and projects above the collar 17, is spaced from the lower end of the section 10a by chisel-pointed distance pieces 19. The distance pieces 19 are welded to the section 10a at 90° intervals. The socket 18 is secured to the brackets 15 by means of matching brackets 20, which are welded to the socket 18.

A cap 21 (see FIGURE 6) is fabricated of mild steel plate with three upstands 22, each 2″ internal diameter larger than the outside diameter of the corresponding flue. Only one upstand and its associated parts is shown in FIGURE 6. The flues will be fitted at this level with three non-conducting distance pieces (not shown) disposed radially, each distance piece to be some ⅞ inch thick. The purpose of these distance pieces is to locate the flues within the upstands, and to eliminate metal to metal contact at the top of the chimney, while permitting the escape of air when insulating material is being filled. The cap is fitted with an external skirt 21a which will lap over the stack outer. An inspection hatch 23 is provided in the cap. A deflector 24 is mounted in the cap above the top of the filling tube, leaving an interval between the tube and the deflector cone of some nine to twelve inches. The purpose of the deflector is to reverse the direction of travel of the insulating material being blown up the central tube.

A permeable apron 25 is fitted between a ring 26 on each flue and a ring 30 at the bottom of each upstand 22 to prevent loss of loose fill, or vermiculite during filling. The top of each flue is completed by a cope band 27 thermally insulated from the flue by a liner 28, and carrying a weatherhood 29 extending over the top of the upstand 22.

Figure 7:
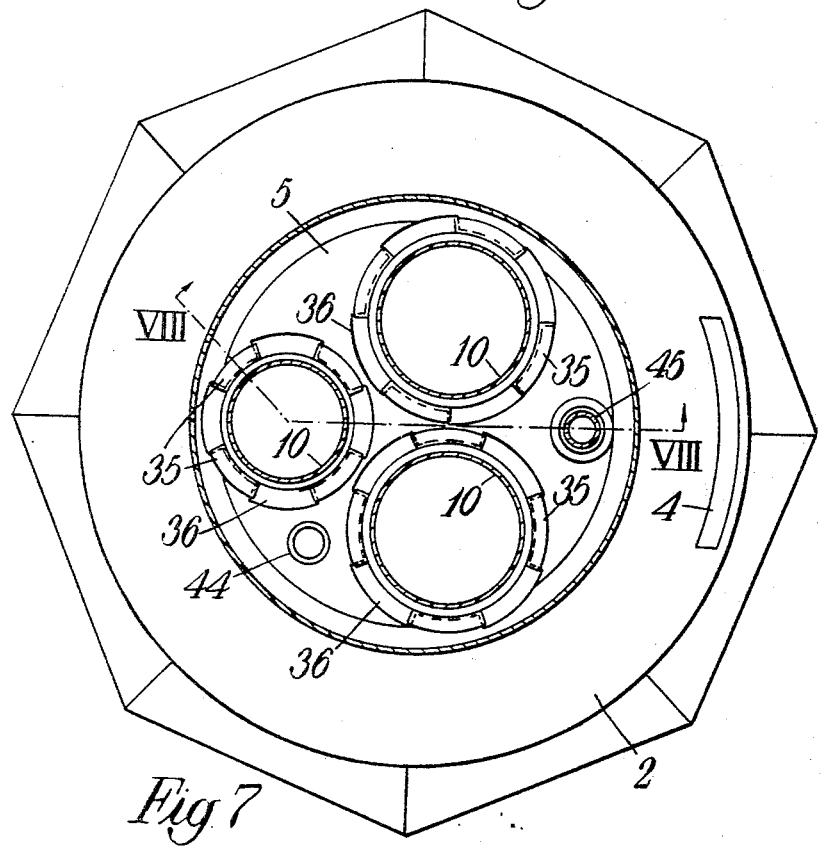
FIGURE 7 is a section, to an enlarged scale, along the line VII—VII.

FIGURES 7 and 8 illustrate the construction at the bottom of the cylindrical section 1, whereat the flues 10 are supported on the supporting plate 5 and connected to aluminium clad mild steel intermediate conduits 31 themselves connected to the branch inlets 3. The conduits 31 each include a cleaning trap 32. Each flue is supported on an upstand 33 bolted to the supporting plate 5 and thermally insulated therefrom by asbestos pads 34 and insulating washers round the bolts. The upstands each include a plurality of flange segments 35 of smaller arcuate extent than arcuate holes 36 in the supporting plate so that the upstands may be inserted through the supporting plate and then rotated to prevent them falling back. Bolts 37 retain the upstands on the supporting plate. A clamp ring 38 faced with thermally insulating material encircles the upstand below holes 36 to ensure that filling material cannot fall through the holes 36.

A sealing ring 39 is located between the flue 10 and the upstand 33 and a surrounding collar 41. The joint is surrounded by a socket 40 welded to the ring 41 and projecting thereabove. Chisel-pointed distance pieces 42 are welded to flue 10 at 90° intervals to space the flue from the socket 40.

The conduits 31 are connected to the upstands by slip joints 43.

A valve 44 for the drawing off of the filling material is provided.

The filling pipe 14 has a flange 45 welded thereonto and this flange is bolted onto the supporting plate 5 around an aperture through which the pipe 14 passes. The lower end of the filling tube is adjacent the door 4 so that a hand operated valve and a female union can be fitted for the filling operation.

FIGURE 9 shows a removable cone 46 attached to the lower end of the flue 10 for the purpose of guiding the flue during lowering into the outer shell. The flue 10 is provided with blind holes 47 in opposed pairs, and closed off by the distance pieces 42. Pins 48 are lengthened by turnbuckle devices 49 to engage securely in the holes 47. The cone 46 is provided with slots 50, 51 to engage and locate on the pins 48 and a hook bolt 52 to hook over one of the pins to support the cone 46 thereon, after use the cone 46 and pins 48 are removed.

The erection sequence is as follows:

(1) The cone section 2 will be erected on prepared foundations complete with supporting plate 5 and attachments.

(2) The cylindrical section 1, complete with locating discs 8 plate 5 will be erected on the cone section 2.

(3) The flue will be lowered into the cylindrical section of the chimney. Joints between flue sections will be connected by workmen on top of the chimney. Each flue is guided through the locating rollers into its upstand on the supporting plate 5 by means of the removable cone 46.

(4) The cap 21 and bands 27 will be fixed.

(5) The cylindrical section 2 will be filled with vermiculite or other lightweight granular insulating material by means of a portable paddle-bladed fan powered by a ½-H.P. to 1-H.P. electric motor.

The flues and/or outer shell need not be of mild steel but may be of any suitable material. For example, the outer shell could be an existing masonry structure into which the locating discs and supporting plate are fitted to support a plurality of flues.

Chimney shells may be made of steel, concrete or brick, in some cases an existing brick or other type of chimney may be used. Flues may be made of steel, resin reinforced glass fibre, or other plastics materials, concrete or brick, or a combination of these.

Figure 10:
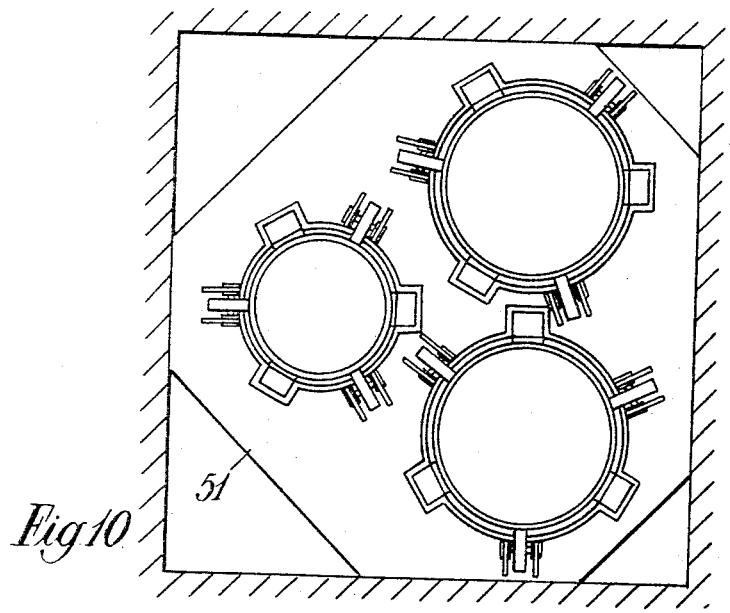
FIGURES 10 to 13 are views similar to FIGURE 3 showing different alternative arrangements.

FIGURE 10 illustrates the form of a locating plate 51 in a square or rectangular stack or outer shell. It will be seen that portions are removed at the corners to provide for passage of the filling material. The flue supporting wheels and rollers are similar to those illustrated in FIGURE 3.

Figure 11:
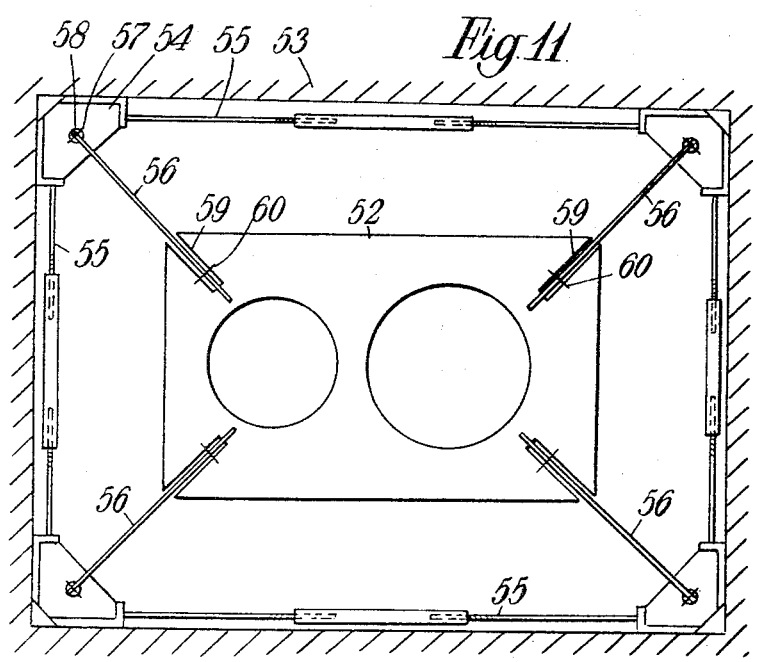

FIGURE 11 shows a method of supporting a locating plate 52 inside a rectangular masonry shell 53. The idea is to enable standardised components to be used to fix locating plates 52 without recourse to building trades. Four corner brackets 54 are forced tightly into the corners of the flue by rods 55 which can be elongated by rotating their centre sections, e.g. by a turnbuckle type of construction. The corners of the corner brackets 54 are cut off lest any protrusions in the corner of the shell prevent them seating tightly. Four heavy slotted steel strips 56 are pivoted about axes 57 to vertical pins 58 free to rotate in holes in the corner brackets 54. These strips pass through slots 59 in the diaphragm plate 52, where they can be secured by bolts 60 passing through lugs not shown alongside the slots 59. Thus a variety of masonry flues could be catered for by having standardised components and a range of different length rods 55 and strips 56.

Figure 12:
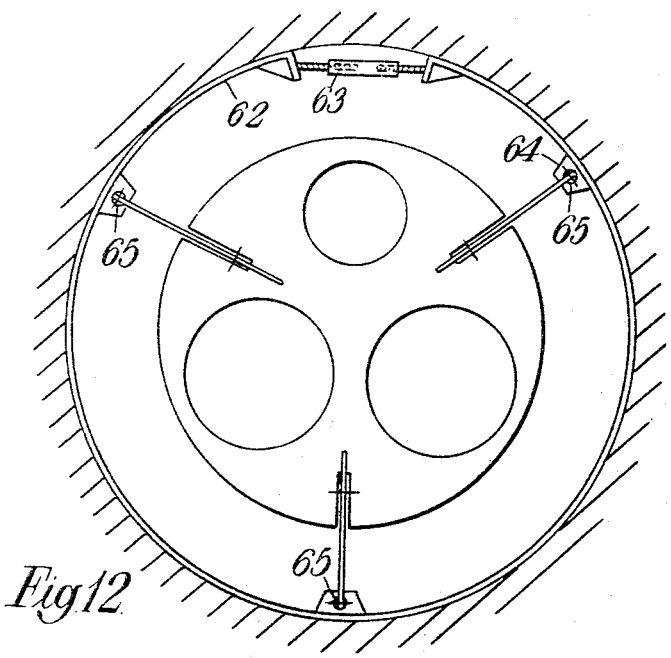

FIGURE 12 shows a variation of the structure of FIGURE 10 applied to cylindrical masonry shell. A steel hoop 62 is expanded inside the flue by an elongating turnbuckle rod 63. This steel hoop 62 has welded to it three brackets 64 to which the slotted strips 56 are universally connected by being pivotally connected to rotatable pins 65. Thus a tripod support is formed instead of a quadrupod as in FIGURE 11.

Figure 13:
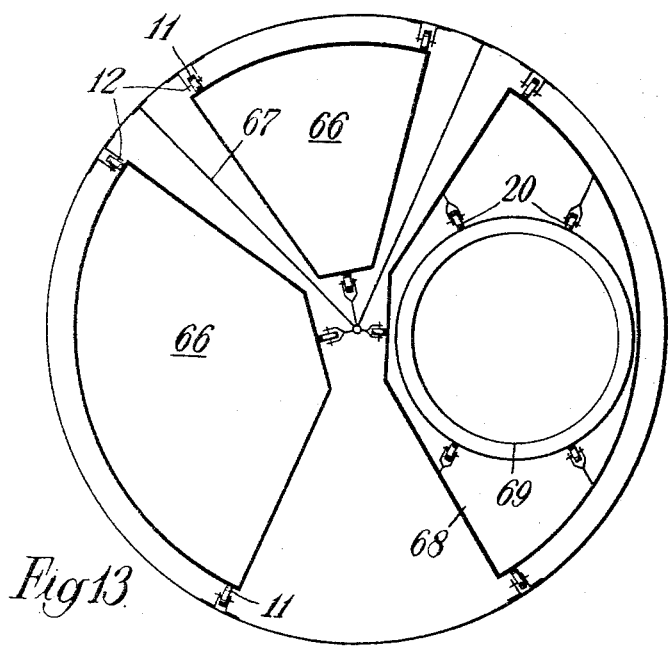

FIGURE 13 shows a construction of a multi-flue chimney wherein the locating plate has been dispensed with. Such a construction leaves the interior of the stack free for a man to ascend inside during assembly or after draining of the loose insulating fill.

Two of the flues 66 are of segmental shape and are directly supported by rollers 11 in spring loaded bearings. In each case two of the rollers at each support level are mounted on the wall of the shell and a third roller is mounted centrally of the shell on a frame 67. A duct 68 is mounted similarly to the flues 66. The third flue 69 is a refractory lined steel flue which is mounted inside the duct 68 by groups of four spring loaded rollers 70 at different levels. The flue 69 is designed for very hot gases, and its steel skin is cooled by a natural draught induced up the duct 68. The spaces between the flues 66, the duct 68 and the outer shell will be filled with a loose fill of insulating material as in the previously described embodiments.

Two forms of single flue chimney embodying the invention will be described with reference to FIGURES 14 to 17.

In these drawings, FIGURES 14 and 15 show an outer shell of a chimney comprising a conical section 71 and a parallel sided section 72. A flanged joint 73 is provided between the sections 71 and 72 and further flanged joints 74 are provided between portions of the section 72. Brackets 75 or the like may be supported at the flanged joints 74 to carry bearings for support rollers or wheels 75 arranged in groups of three or more around the flue 77 to support the same laterally while allowing longitudinal movement occasioned by thermal expansion or contraction. The rollers or wheels may be in spring loaded bearings to allow for variations in the lateral dimensions of the flue due to thermal changes or joints such as 78.

An annular supporting plate 79 is supported by the flanged joint 73 and is provided at intervals with apertures 80. A collar 81 of an upstand 82 is secured to the base plate 79 by means of studs 83 passing with clearance through the apertures 80 and secured by nuts 84. Thermal insulating material 85 is provided between the base plate 79 and the collar 81 and the nut 84. By this means metal to metal contact between the upstand 82, in contact with the flue gases, and the supporting plate 79 in contact with the outer shell, is avoided. Also the extension of the upstand down through the supporting plate shields the latter from contact with the flue gases.

Weather cravats would be provided, which, in a multi-flue chimney would be fixed to the top of the flues, and lap over the upstands on the chimney cap through which the flues pass.

In the single flue chimney illustrated, the cravat 85 is fastened to the inner flue, and laps over the outer shell. In both cases the function of the cravat is to prevent water entering the annulus between the inner and outer cylinders. The weather cravat may be fastened to the inner flue in a manner which obviates metal to metal contact between cravat and flue to prevent undue reduction in the metal temperature of the upper portion of the flue.

FIGURES 16 and 17 show an arrangement in which the single flue chimney is mounted directly on a boiler 91 having an upstanding flue gas outlet 92. In this case the outer shell 93 is mounted on the outlet 92 by means of a flanged joint incorporating thermal insulating material 94 and the flue 95 itself may rest on the outlet 92 by means of a collar 96.

In this embodiment the wheels or rollers 77 are supported on brackets 98 integral with or attached to portions 97 of the outer shell 93 which are of greater diameter than the rest of the outer shell so that the brackets can be accommodated without increasing the external dimensions of the whole outer shell. The increase in diameter is obtained by reversing the flanges 98 on the portions 97 so that they point inwardly instead of outwardly.

The mountings for the rollers 77 as described in FIGURES 14 and 15 may be used for a flue of the type shown in FIGURES 16 and 17 and vice versa. Also the flue has been described as being thermally insulated from the base plate to prevent heat conduction to the outer shell. This effect may also be obtained by providing thermal insulation between the base plate and the outer shell.

Various other modifications may be made within the scope of the invention. Thus, the flue may be of glass fibre reinforced synthetic resin material. Also the deflector 24 may be replaced by a return bend in the tube 14.

In certain constructions, particularly with comparatively short chimneys it may be most convenient to have a single set of support rollers mounted in the cap.

I claim:
1. A chimney comprising an outer shell and at least one fabricated flue supported within the shell; the chimney having the improvement that it comprises at least one group of rollers or wheels mounted on the outer shell and spaced around the said at least one flue in rolling contact therewith to provide lateral support and guidance for the said at least one flue during longitudinal movement arising from thermal expansion and contraction and introduction and removal from the outer shell, and a loose fill of insulating material filling the space within the outer shell and outside the said at least one flue.

2. A chimney as claimed in claim 1, comprising at least one apertured plate or disc secured in the shell intermediate its ends, the flues extending through the apertures and the rollers or wheels being mounted on said at least one plate or disc and spaced around the corresponding apertures.

3. A chimney as claimed in claim 1, comprising a plurality of flues, and at least one sub-frame supported by the shell, and in which some of the rollers or wheels are mounted on the shell and others are mounted on the said at least one sub-frame supported by the shell.

4. A chimney as claimed in claim 1 comprising spring loaded support rollers or wheels for mounting so that the outside dimension of the flue or flues may vary without affecting the operation of the support rollers or wheels.

5. A chimney as claimed in claim 1, comprising a facing on each of the rollers or wheels, the said facing being formed of a material having a low heat conductivity to reduce the heat conduction between the and at least one flue and the outer shell.

6. A chimney as claimed in claim 1, wherein the insulating material is vermiculite.

7. A chimney as claimed in claim 1, comprising a filling tube for supplying the loose fill of insulating material, the said tube being secured to the outer shell and extending within the said space inside the outer shell and being provided with a means at the top adjacent the centre or axis of the shell, whereby granules of insulating material blown up the tube are deflected and allowed to fall down inside the outer shell until the latter is filled.

8. A chimney as claimed in claim 7, in which the means for deflecting the granules is a return bend in the tube.

9. A chimney as claimed in claim 2, comprising at least one supporting assembly mechanically expanded to grip the wall of the shell, each said assembly supporting one of the said apertured plates or discs.

10. A chimney as claimed in claim 9, wherein the outer shell is square or rectangular and wherein each supporting assembly includes corner pieces adapted to fit into the corners of the shell, and to support the plate, and expandable rods including turnbuckle means to force the corner pieces into the corresponding corners.

11. A chimney as claimed in claim 9, in which the shell is cylindrical and the supporting assembly includes a hoop member and a turnbuckle device between adjacent ends of the hoop member to expand the hoop member against the wall of the cylindrical shell.

12. A chimney as claimed in claim 1, comprising a single flue within the outer shell, and wherein the outer shell is built up from sections having jointing flanges extending around the shell, brackets being secured between at least one pair of adjacent jointing flanges, the said rollers or wheels being mounted on the brackets.

13. A chimney as claimed in claim 1, wherein the outer shell is generally cylindrical and includes at least one short section of slightly increased diameter as compared with the diameter of the major portion of the shell comprising a single flue within the said outer shell, and wherein the rollers or wheels are mounted on said at least one short section of increased diameter.

14. A chimney as claimed in claim 1, comprising at least one set of rollers or wheels mounted on the wall of the outer shell, a duct supported by said at least one set of rollers or wheels, at least one set of rollers or wheels mounted in the duct, and at least one flue supported within the said duct by said last mentioned at least one set of rollers or wheels.

15. A chimney as claimed in claim 1, comprising an apertured cap closing the upper end of the outer shell, the said at least one flue passing through the aperture with a clearance, the supporting rollers or wheels being supported by the cap.

References Cited

UNITED STATES PATENTS

| | | | |
|---|---|---|---|
| 268,860 | 12/1882 | Browell | 126—307 |
| 1,106,491 | 8/1914 | Casa-Calvo | 98—58 |
| 1,122,130 | 12/1914 | Lamson | 138—113 |
| 1,763,775 | 6/1930 | Gottwald | 138—113 |
| 2,821,900 | 2/1958 | Primich | 98—60 |
| 2,855,874 | 10/1958 | Edwards | 126—307 X |
| 2,976,797 | 3/1961 | Newbill | 126—307 X |

FOREIGN PATENTS 119,330   10/1930   Austria.

KENNETH W. SPRAGUE, *Primary Examiner.*